July 9, 1935.    N. G. DE RACHAT    2,007,242
PROCESS AND APPARATUS FOR RECLAIMING FILTERING CLAY
Original Filed Dec. 11, 1931
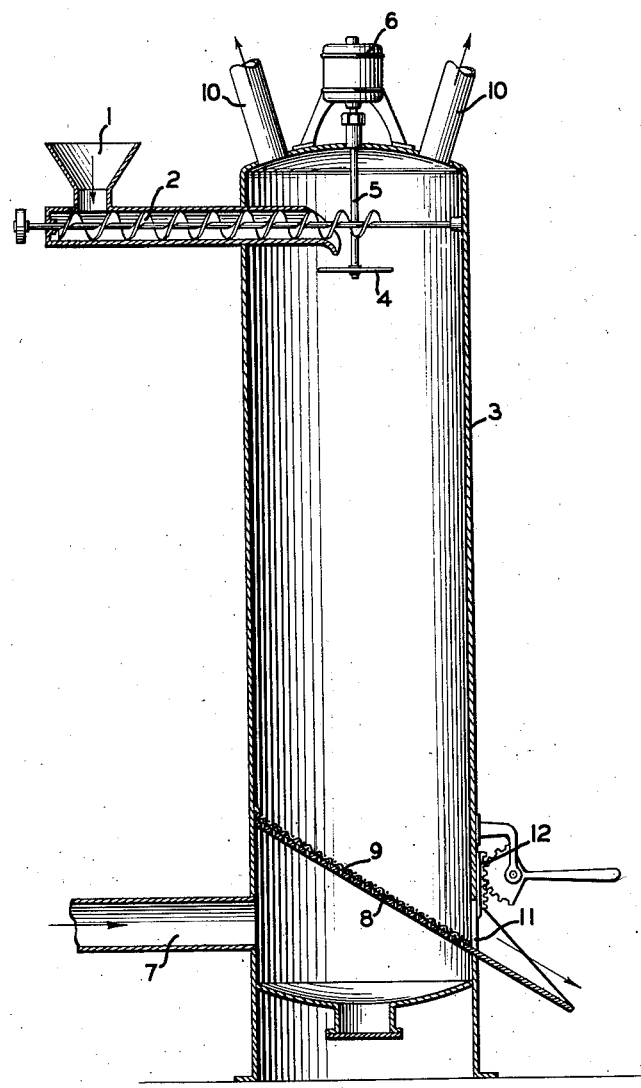
INVENTOR
NICHOLAS G. DE RACHAT Patented July 9, 1935

2,007,242

UNITED STATES PATENT OFFICE 2,007,242

PROCESS AND APPARATUS FOR RECLAIMING FILTERING CLAY

Nicholas G. de Rachat, Chicago, Ill., assignor to Universal Oil Products Company, Chicago, Ill., a corporation of South Dakota Application December 11, 1931, Serial No. 580,475
Renewed June 1, 1933

6 Claims. (Cl. 252—2)

This invention relates to the reclamation of clays and more particularly refers to an improved process and apparatus for reviving adsorbent treating materials such as fuller's earth and other clays.

It has long been the practice to revive clays, such as fuller's earth, after their prolonged use in the treatment of hydrocarbon oils as filtering or polymerizing material or the like by burning away or otherwise volatilizing the hydrocarbons which the clay absorbs and which decrease or destroy its treating value by decreasing its porosity. This is usually accomplished by passing the clay counter-current to a stream of hot relatively inert gases such as combustion products and may be further assisted by commingling sufficient quantities of air with the inert gases to permit partial combustion of the hydrocarbons contained within the clay or volatilized therefrom by the heated inert gases.

The present invention is concerned with improvements to this type of process which comprise a method and means of uniformly dispersing the clay within the stream of heating medium, thus insuring substantially uniform treatment of the entire mass of clay and resulting in a higher rate of reclaiming treatment a greater recovery of revived clay and a product of greater uniformity.

The attached diagrammatic drawing illustrates one specific form of apparatus embodying the principles of the present invention; the clay to be revived may be collected in a hopper 1 from which it is discharged by suitable means such as a helical conveyor 2, driven by any suitable motivating means, not illustrated in the drawing, into chamber 3. The clay is continuously discharged in a relatively small stream from conveyor 2 onto a rapidly rotating disc 4 which is driven through shaft 5 by any suitable motivating means such as an electric motor 6 which may be mounted upon the chamber 3.

The clay to be revived, particularly when it has been used in the polymerization treatment of hydrocarbon vapors or in the filtration of lubricating oils or the like, will ordinarily be supplied to the reclaiming zone in a relatively wet state and, particularly when polymers are present, will not flow freely but will tend to ball up and stick to the surfaces with which it comes in contact. The centrifugal force imparted to this material by the revolving disc 4 disrupts the wet mass, separating it into a spray of fine particles which are distributed across the area of the heating zone 3. When the stickiness of the clay tends to obstruct its passage through the conveyor 2 a diluent such as oil or water may be added by well known means, not illustrated in the drawing.

The heating medium, such as relatively hot flue gas, which preferably contains a sufficient quantity of air to support combustion of at least a portion of the hydrocarbons in the wet clay, may be introduced into the lower portion of chamber 3 through duct 7, passing through a perforated plate 8 and screen 9 and upward through chamber 3 counter-current to the descending clay.

Combustion products, together with any hydrocarbon vapors and gases which are not burned, are discharged from chamber 3 through one, or preferably, a plurality of outlets 10. The gases may be scrubbed or otherwise treated for the recovery of liquefiable hydrocarbons which they may contain or when such an operation is not justified they may be utilized as fuel or wasted.

Perforated plate 8, which is disposed within the lower portion of chamber 3 serves to uniformly distribute the heat carrying medium across the diameter of the chamber and also serves as a supporting means for a wire mesh screen 9 which retains the recovered clay. Perforated plate 8 is preferably inclined to permit easy removal of the clay which is discharged through a port 11, regulated by any suitable means such as a sliding gate 12. If desired, a bed of clay may be retained upon plate 8 to further assist in distributing the hot gases and also serving as a means of retaining the clay in the recovery zone for a longer period of time and insuring its complete devolatilization.

While only one revolving disc is illustrated in the drawing it will be understood that a plurality of these may be employed, when desired, to repeatedly distribute the clay across the diameter of chamber 3 in which case suitable baffles, not illustrated in the drawing, may direct the clay onto the successive revolving discs.

It will also be understood that many other modifications of the specific type of apparatus herein illustrated and described may be utilized without departing from the principles and scope of the invention.

I claim as my invention:

1. A method for reclaiming filtering clays comprising charging the clay to the upper portion of a treating tower, causing the same to immediately fall upon a rotating disc moving at high velocity from whence the clay is centrifugally forced toward the walls of the tower, introducing hot flue gases to the bottom of the tower to rise counter-current to the descending clay in the tower and to be, by virtue of the fine distribution of the clay, brought into intimate contact with the particles thereof, taking off vapors released from oil carried by the clay and the flue gases from the top of the tower and removing the reclaimed clay from the base of the tower.

2. An apparatus for reclaiming filtering clays comprising a vertically elongated tower, a rotating plate of less area than the cross sectional area of the tower located near the upper end thereof, means for driving said rotating plate, means for delivering clay to the tower centrally thereof above the plate whereby the clay is centrifugally forced toward the walls of the tower at the upper portion thereof, means for introducing flue gases near the bottom of the tower, means for taking off vapors and gases from the top of the tower and means for removing reclaimed clay from the bottom of the tower.

3. A method for reclaiming filtering clays which comprises charging the clay to the upper portion of a treating zone, introducing a gaseous heating medium to the lower portion of and passing the same upwardly through the treating zone, applying centrifugal force to the clay in the upper portion of the treating zone to thereby disperse the same through the heating medium, passing the thus dispersed clay downwardly through the treating zone in countercurrent contact with the rising heating medium, removing vapors and gases from the upper portion of the treating zone and separately removing the reclaimed clay from the lower portion of the treating zone.

4. An apparatus for reclaiming filtering clays which comprises a vertical tower, means for charging the clay into the upper portion of the tower, means for introducing heating gases to the lower portion of the tower to pass upwardly therethrough, a rotary disc adjacent the upper portion of the tower for uniformly dispersing the clay within the heating gases, means for removing vapors and gases from the upper portion of the tower, and means for removing the reclaimed clay from the lower portion of the tower.

5. An apparatus for reclaiming filtering clays which comprises a vertical tower, means for charging the clay into the upper portion of the tower, means for introducing heating gases to the lower portion of the tower to pass upwardly therethrough, means adjacent the upper portion of the tower for applying centrifugal force to the clay to disperse the same through the heating gases, means for removing the vapors and gases from the upper portion of the tower, and means for removing the reclaimed clay from the lower portion of the tower.

6. In the reclaiming of filtering clays and the like, the method which comprises applying centrifugal force to the clay and dispersing the same in a hot gaseous atmosphere, and passing the dispersed clay downwardly by gravity through said atmosphere.

NICHOLAS G. DE RACHAT.